United States Patent
Newton

(10) Patent No.: US 6,256,519 B1
(45) Date of Patent: Jul. 3, 2001

(54) CORDLESS TELEPHONE WITH CORDED OPERABILITY

(75) Inventor: Kenneth Alan Newton, Whitehall, PA (US)

(73) Assignee: Lucent Technologies, Inc., Murray Hill, NJ (US)

( * ) Notice: Subject to any disclaimer, the term of this patent is extended or adjusted under 35 U.S.C. 154(b) by 0 days.

(21) Appl. No.: 09/020,315

(22) Filed: Feb. 9, 1998

(51) Int. Cl.[7] ..................................................... H04B 1/38
(52) U.S. Cl. ........................... 455/572; 455/575; 455/90; 455/462; 455/557; 379/433
(58) Field of Search .............................. 455/575, 90, 550, 455/572, 573, 574, 462, 556, 557, 461, 465, 569, 67.1, 561; 320/110, 111, 112, 113, 114, 115; 379/428, 431, 433

(56) References Cited

U.S. PATENT DOCUMENTS

| | | | |
|---|---|---|---|
| 4,752,949 | * | 6/1988 | Steinbeck et al. .................... 455/462 |
| 5,010,565 | * | 4/1991 | Nash et al. ............................ 455/462 |
| 5,105,460 | * | 4/1992 | Williams ............................... 455/462 |
| 5,528,667 | * | 6/1996 | Steffensen et al. ................... 455/462 |
| 5,596,626 | * | 1/1997 | Nakayama ............................ 455/462 |
| 5,758,289 | * | 5/1998 | Lipp et al. ............................. 455/462 |
| 6,002,937 | * | 12/1999 | Young et al. ......................... 455/462 |
| 6,036,086 | * | 3/2000 | Sizer, II et al. ....................... 235/375 |

* cited by examiner

Primary Examiner—Doris H. To
(74) Attorney, Agent, or Firm—William H. Bollman

(57) ABSTRACT

The present invention provides a cordless telephone having the ability to operate when power fails to the base unit. In a first embodiment, the handset includes a switch and a telephone line interface to connect a speaker and microphone directly to the public switched telephone network (PSTN) bypassing the base unit and allowing corded telephone operability of the handset of the cordless telephone. In a second embodiment the handset provides power to the base unit in the event of an AC power failure to the base unit. In this corded mode, the battery of the handset provides auxiliary power to the base unit. To further reduce power consumption and increase operation time of the battery in the handset, the RF transceivers of the base unit and handset can be unpowered by the provided direct serial connection between serial interfaces of the base unit and handset. In both embodiments, the cordless telephone operates in conventional fashion when in a wireless mode.

13 Claims, 4 Drawing Sheets

CORDLESS TELEPHONE WITH CORDED OPERABILITY

BACKGROUND OF THE INVENTION

1. Field of the Invention

This invention relates to cordless telephones, and more particularly to a cordless telephone which includes an alternative configuration for use without power to a base unit.

2. Background of Related Art

Cordless remote telephones are popular consumer devices which allow a user in a home or office the freedom to stray hundreds or even thousands of feet from a base unit. Initially, the handsets of cordless telephones communicated with their base unit using analog signals. In more recent years, advancements have been made with respect to cordless telephones allowing digital communications between the handset and its base unit.

With the advancement in technology of cordless telephones, processors such as digital signal processors or microprocessors have been included within the base unit and/or the handset of a cordless telephone. The processors provide the cordless telephone with a vast array of features, but require a power source to operate.

Since the early days of telephones, a small amount of power has typically been provided on a telephone line by a central office for use by a telephone (customer premises equipment) connected to the telephone line. The power was typically used by the central office to sense on- and off-hook conditions, and by the user as a byproduct, e.g., to illuminate the telephone dial or keypad, and/or to bias a microphonic device, and/or to power a dual tone, multiple frequency (DTMF) device at the customer premises equipment. Even though the power provided by the telephone central office may be sufficient to power some conventional telephone devices such as standard wired handsets, there is nevertheless generally insufficient current available within regulatory guidelines to power the components of a cordless telephone. Thus, cordless telephones have generally and conventionally required external power sources.

The power source for a base unit of a cordless telephone typically is general household current, e.g., 120 volts AC, 50–60 Hz in the United States. The handset of the cordless telephone is typically powered by a battery. In most cases, the externally powered base unit also provides charging power for the battery in the handset when coupled with the base unit.

For all the advantages provided by the use of processors, RF transceivers and/or other externally powered devices, a conventional cordless telephone is nevertheless rendered useless during a power failure.

For instance, power may be removed from the base unit when severe weather conditions knock power lines to the home or office out of service. In such conditions, it may be desirable to utilize the telephone, particularly in emergency or life threatening situations. Without power, the conventional cordless telephone is incapable of placing or receiving telephone calls.

FIG. 4 depicts a conventional cordless telephone including a base unit 400 and a handset 450. The base unit 400 and the handset 450 each include a respective antenna 414, 466 for use in transmitting a radio frequency (RF) signal therebetween.

The base unit 400 includes a telephone line interface (TLI) 410 and cable 412 (e.g., including an RJ-11 telephone jack) for interconnection with a central office via a standard wall jack or the like. Although available, the conventional base unit typically does not draw a significant amount of power from the telephone line for powering devices therein. Of course, power is drawn from the telephone line to provide proper DC and AC characteristics to the central office. However, an external AC power source is utilized to power the components of the conventional cordless telephone.

A standard power cable 402 provides standard AC power to an alternating current (AC)-to-direct current (DC) converter 404. AC/DC converter 404 converts power from the external power source into DC power for use by a processor 408, RF transceiver 406, and other externally powered devices within the base unit 400. If the telephone line interface (TLI) 410 (otherwise known as a hybrid) is an active device, then it too is powered by the AC-to-DC converter 404. The AC/DC converter 404 is typically protected by a diode 407 or other isolating device.

A conventional handset 450 typically includes, besides antenna 466, an RF transceiver 454, a processor 456 such as a DSP, microcontroller or microprocessor, an analog-to-digital (AND) converter 458, and a digital-to-analog (D/A) converter 460, all powered by a battery pack 452. A microphone 462 provides an analog signal to the A/D converter 458, and a speaker 464 outputs an analog signal from D/A converter 460. A conventional 12 or 16-key keypad 467 allows direct user input and standard operation of the cordless telephone During normal operation, the base unit 400 communicates with its handset 450 using a processed RF signal transmitted between antennae 414, 466. Unfortunately, as discussed above, a power failure will render the conventional base unit 400 virtually useless because the RF transceiver 406 and the DSP 408 will not be operational for lack of power. This is not a desirable situation, and in emergency situations may be life threatening if a separate, non-cordless telephone is not available. This causes the need to maintain an entirely separate corded telephone in another location in the home or office, whether or not a cordless telephone is also in service.

There is a need to provide a cordless telephone which has the ability, particularly in emergency situations, to be operated even when power is removed from the base unit.

SUMMARY OF THE INVENTION

In accordance with the principles of the present invention, a handset of a cordless telephone comprises both an RF transceiver and a telephone line interface. An audio module is adapted for communication with either the RF transceiver or the telephone line interface.

BRIEF DESCRIPTION OF THE DRAWINGS

Features and advantages of the present invention will become apparent to those skilled in the art from the following description with reference to the drawings, in which.

DETAILED DESCRIPTION OF ILLUSTRATIVE EMBODIMENTS

The preset invention overcomes the disadvantages of the prior art by providing a cordless telephone which is capable of operation as a corded telephone when the base unit is unpowered.

Figure 1:
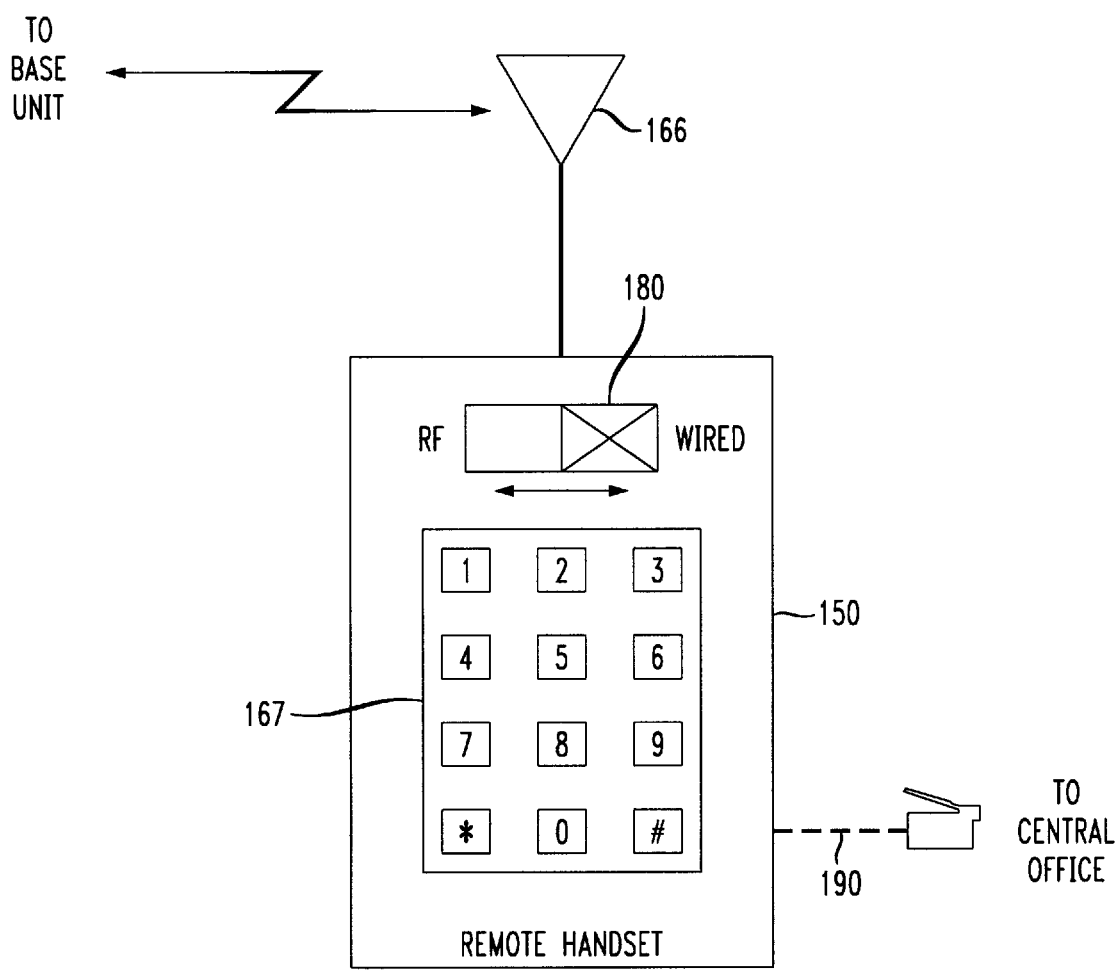
FIG. 1 shows a handset of a cordless telephone having an optional connection directly to a public switched telephone network (PSTN) via a central office, in accordance with the principles of the present invention.

FIG. 1 shows a first embodiment of the present invention. In FIG. 1, a handset of a cordless telephone includes an optional direct connection to a public switched telephone network (PSTN) via a central office for times when the base unit is unpowered. The present invention adds the ability for the handset 150 to connect directly to the PSTN should such connection become necessary, e.g., due to a power failure to the base unit, or due to a malfunction of the base unit. A cordless telephone in accordance with the principles of the first embodiment of the present invention includes operability in a wired mode wherein the handset of the cordless telephone operates as a telephone in direct connection with the public switched telephone network (PSTN), bypassing the base unit.

In particular, a handset 150 includes conventional elements such as a twelve- or sixteen-button standard telephone keypad 167 and an antenna 166 for transmitting and receiving radio frequency (RF) communications with its base unit (not shown). In this first embodiment, the handset 150 includes a switch 180 for selection between a normal operating mode of the handset 150 utilizing a wireless link with the base unit, and a wired operating mode wherein the base unit is completely bypassed and the handset 150 is plugged directly into the wall outlet or other connection to the telephone line from the central office.

Figure 2:
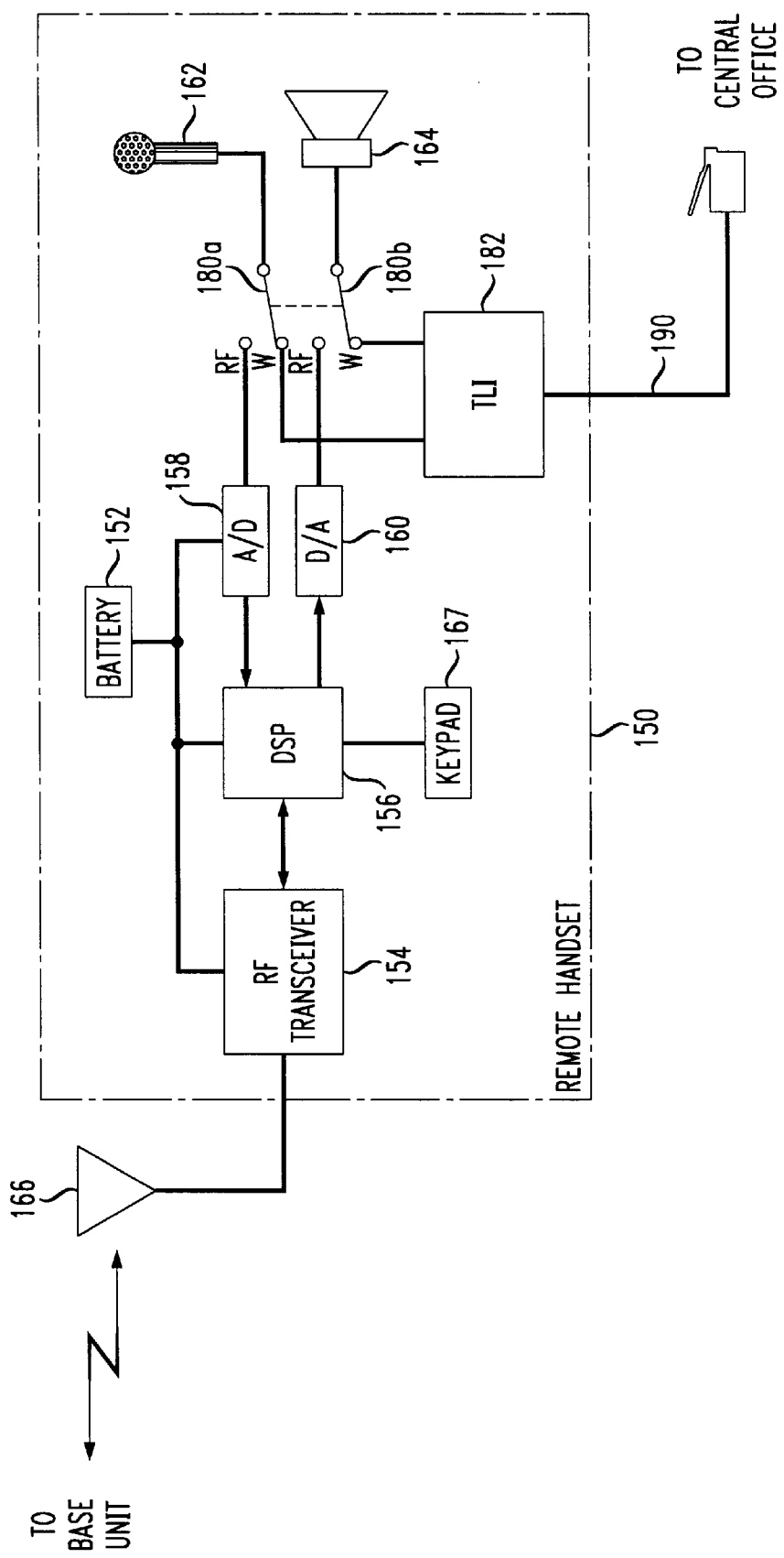
FIG. 2 is a more detailed depiction of the handset of a cordless telephone shown in FIG. 1.

FIG. 2 shows relevant features of handset 150 in more detail. In FIG. 2, switch 180 is a double pole, double throw (DPDT) switch having two poles or elements 180a, 180b controlling the connections to a microphone 162 and to a speaker 164.

The switch 180 can be placed in either position, RF or W, depending upon the operational mode of the telephone. For instance, when the switch 180 is in the normal operating mode, The switch elements 180a and 180b are each in positions RF designated in FIG. 2. In this mode, the analog signal from microphone 162 is converted into a digital signal in an analog-to-digital (A/D) converter 158, and passed to a processor 156. The processor may be any suitable processor for the application, such as a digital signal processor (DSP), microprocessor, or microcontroller. In the disclosed embodiment, the processor 156 is a DSP. The DSP 156 encodes data from the A/D converter 158 as necessary using, e.g., linear, $\mu$-law, A-law, adaptive differential pulse code modulation (ADPCM), code excited linear prediction (CELP) or other conventional encoding technique. The DSP 156 also supports DTMF tones as directed by the standard telephone keypad 167, and performs other conventional handset functions necessary to support RF communications between a base unit of a cordless telephone and its handset.

The transmit portion of an RF transceiver 154 transmits the digital signal processed by the DSP 156 to the base unit (not shown), and a receive portion of the RF transceiver 154 receives the digital signal transmitted by the base unit.

A standard telephone line interface (TLI) (otherwise known as a hybrid) 182 is in communication with the microphone 162 and speaker 164 through switch 180, and provides direct access to the telephone line 190 from the central office. When the switch 180 is in the wired W position, the TLI 182 provides a direct connection between the microphone 162 and speaker 164, and the telephone line 190.

Switch 180 may be a manual switch as shown in FIGS. 1 and 2, or may be a suitable mechanical or electrical relay which is operated either by a manual switch or under the control of software contained within the DSP 156 or other logic device. Switch 180 may be automatically tripped into position W upon connection between the TLI 182 and a central office, e.g., upon sensing of line current in telephone line 190. Switch 180 may also be a multiplexer or other electronic device which provides selective communication between the microphone 162 and speaker 164, and the TLI 182.

In operation, the switch 180 is normally kept in the normal operating position RF for conventional operation of the cordless telephone as a wireless cordless telephone. However, should the occasion arise that the base unit becomes inoperable either due to a power failure, malfunction, or other cause, the present invention provides that the handset of the cordless telephone may be operated as a corded telephone. Corded operability of the cordless telephone in accordance with the principles of the present invention avoids the necessity for a separate, corded telephone in addition to the cordless telephone to provide security and telephone access, particularly for times when the power to the base unit fails or is otherwise unavailable.

Note that the RF transceiver 154, DSP 156, A/D converter 158, and D/A converters 160 are all powered by the battery 152 as in a conventional handset device. However, to reduce battery consumption, these elements need not be powered when the switch 180 is placed in the wired W position for corded operation of the handset 150. Rather, they may be unpowered, unenabled, or otherwise halted from operation when the handset is connected directly to the PSTN, bypassing the base unit.

But for the inclusion of the switch 180, the handset 150 otherwise includes conventional elements and operates in a conventional fashion. The switch 180 may be eliminated by connecting the microphone to both the A/D converter 158 and the TLI 182, and by connecting the speaker to both the D/A converter 160 and the TLI 182. However, this configuration does not prevent the undesirable operation of the handset simultaneously in both the wireless mode and the corded mode.

Figure 3:
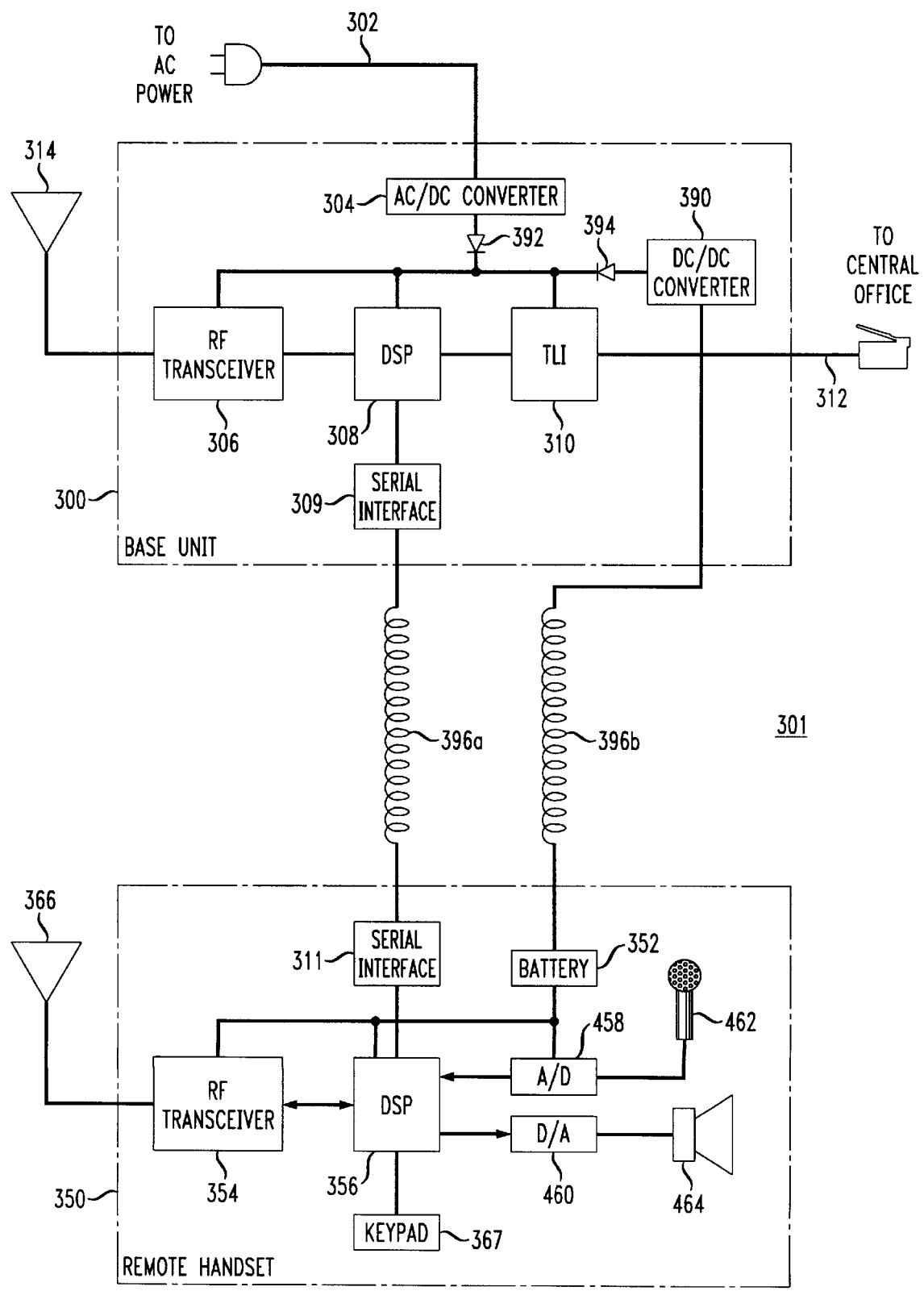
FIG. 3 shows a second embodiment of the present invention wherein the handset of a cordless telephone is wired directly to its base unit to be operable even when power is removed from the base unit.
Figure 4:
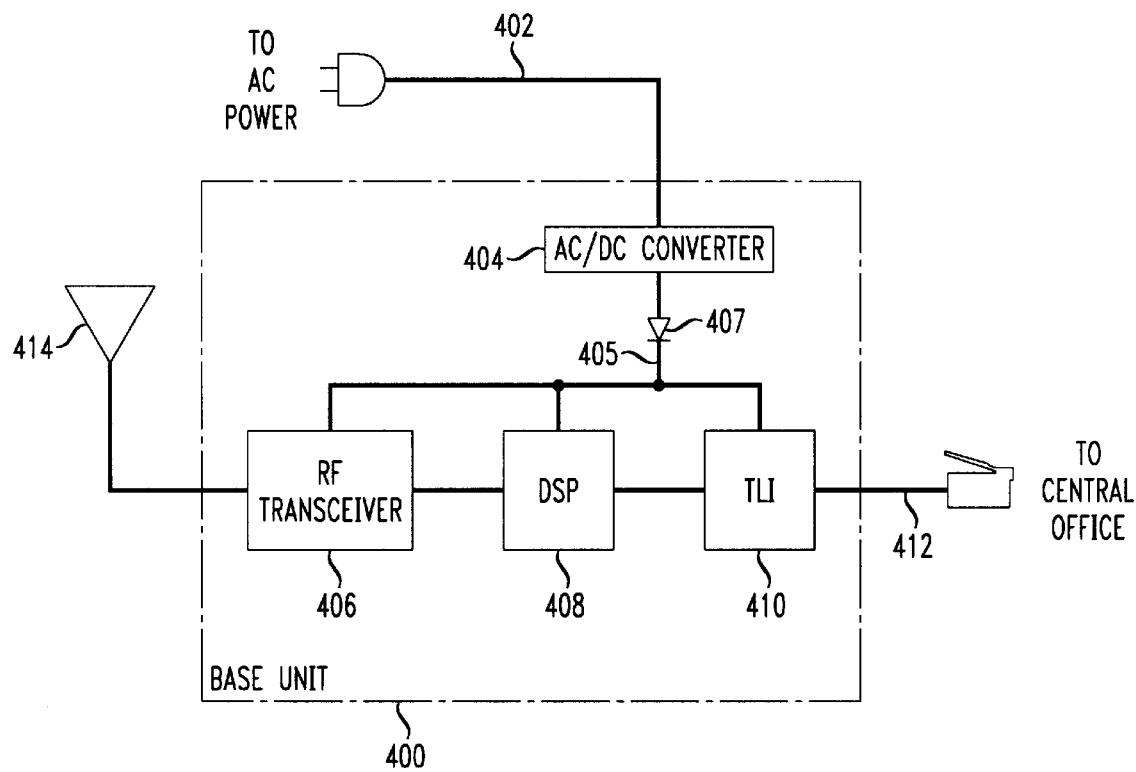
FIG. 4 shows a conventional cordless telephone.
Figure 4:
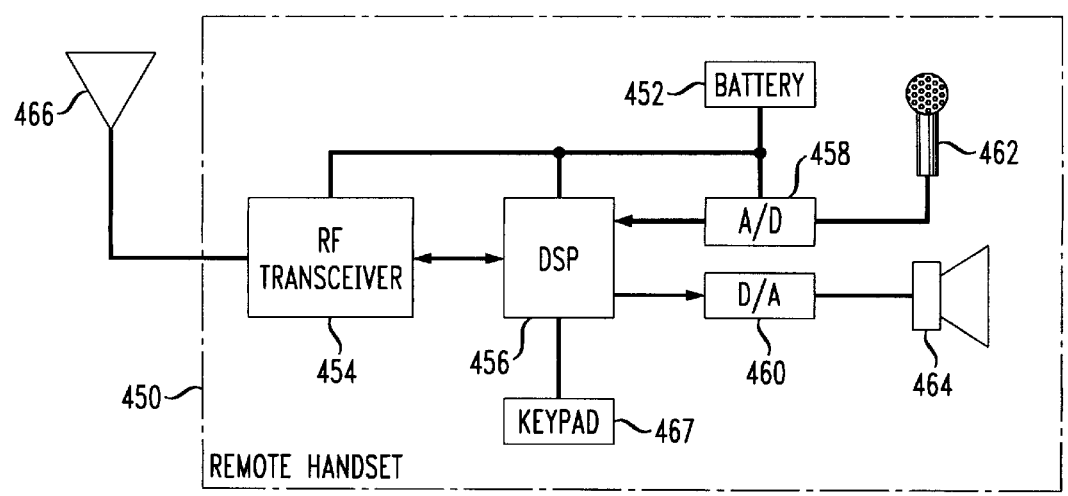

FIG. 3 shows a second embodiment of the present invention. In this embodiment, when the base unit 300 is unpowered by conventional means but is otherwise operational, the battery 352 of handset 350 may be used to power the base unit 300 to allow the handset 350 to place and receive telephone calls.

In particular, the handset 350 of the second embodiment includes an antenna 366, an RF transceiver 354, a keypad 367, an A/D converter 458, a D/A converter 460, a microphone 462 and a speaker 464 similar to those in the prior art and as described herein above except as otherwise described herein with respect to the present embodiment. However, the handset 350 additionally includes a serial interface 311 either internal to or in communication with the DSP 356 to provide direct data access to the DSP 356. The handset 350 further includes external access to the battery 352 to provide the base unit with DC power as necessary.

Similarly, the base unit includes a serial interface 309 either internal to or in communication with the base unit's processor (e.g., DSP) 308. A DC-to-DC (DC/DC) converter 390 accepts DC power from the battery 352 of the handset 350 and converts the power as necessary to power the RF transceiver 306, the DSP 308, the TLI 310 and the serial interface 309 of the base unit. If the power from the battery 352 is compatible with the power requirements of the base unit 300, the DC/DC converter 390 may be eliminated to reduce complexity and cost.

In normal operation, the handset 350 remains detachable from the base unit 300. During normal telephone operation, the base unit 300 communicates with the handset 350 via RF communications between the antenna 366 of the handset 350 and the antenna 314 of the base unit 300. In this normal operating mode, the serial interface 311 of the handset 350 and the serial interface 309 of the base unit 300 are unoperated and may be unenabled, unpowered or otherwise halted from operation to conserve power. Cord 396a, 396b, used for the inventive corded operation mode of the cordless telephone 301, is not used for normal wireless operation of the cordless telephone 301.

The present invention provides the ability for the handset 350 to provide a direct communication link and battery power to the base unit 300 should the base unit lose power from the AC/DC converter 304 plugged into a household AC power outlet. In this corded operation mode, a cord 396a, 396b is connected between the handset 350 and the base unit 300 to interconnect the serial interface 311 of the handset 350 with the serial interface 309 of the base unit 300, and the battery 352 with the DC/DC converter 390 of the base unit 300. The cord 396a, 396b and associated sockets in the handset 350 and base unit 300 may utilize standard telephone style connectors at each end, e.g., RJ-45 or RJ-11 type connectors, although virtually any disconnectable plug and socket combination is contemplated and may be implemented.

When the cordless telephone 301 is in the corded mode, i.e., when cord 396a, 396b is connected between the handset 350 and the base unit 300, the battery 352 of the handset 350 provides power not only to the components of the handset 350 but also to the base unit 300. The user may manually indicate to the DSP 356 the corded status of the cordless telephone by input to the keypad 367, or such status may be sensed by a processor or other logic device in either the handset 350 or the base unit 300. Upon such sensing, the handset 350 and/or the base unit 300 may de-power or unenable certain devices not essential to providing the handset 350 with the ability to place and receive telephone calls. For instance, during corded operation, the RF transceiver 306 of the base unit 300 and the RF transceiver 354 of the handset 350 are not necessary and un-enabling them can provide significant power savings and thus increase operational time if unpowered.

Moreover, for simplicity, the serial interface 309 in the base unit 300 and the serial interface 311 in the handset 350 may be eliminated, as well as the portion 396a of the cord. Thus, while being in a corded mode with cord 396b providing power to the base unit 300 from the battery 352 of the handset 350, the handset 350 will continue to communicate with the base unit 300 via RF communications between respective antennae 314, 366.

The present invention, while described and shown with respect to a digital cordless telephone, is equally applicable to analog cordless telephones, particularly those operable in the 902 to 928 megahertz (MHz) band in the United States, although the invention is equally applicable to cordless telephones operating at any frequency in any country.

The features of the first and second embodiments shown and described herein may be combined to provide a handset capable of either connecting directly to the PSTN via a telephone line from the central office, or of powering its base unit to allow at least limited operation of the cordless telephone when the base unit is unpowered by conventional means.

While the invention has been described with reference to the exemplary preferred embodiments thereof, those skilled in the art will be able to make various modifications to the described embodiments of the invention without departing from the true spirit and scope of the invention.

What is claimed is:

1. A handset of a cordless telephone, said handset comprising:
    a processor;
    an RF transceiver in communication with said processor;
    a microphone to provide audio data to said processor;
    a speaker to output audio data from said processor;
    a keypad in communication with said processor; and
    a battery to power said processor, said battery including access external to said handset to provide electrical power to a base unit when said base unit is unpowered.

2. The handset of a cordless telephone according to claim 1, further comprising:
    an external cord for directly interconnecting said handset with said base unit.

3. The handset of a cordless telephone according to claim 1, wherein:
    said external cord interconnects said battery of said handset with said base unit.

4. A handset of a cordless telephone comprising:
    a plurality of internal components; and
    a battery to power at least some of said plurality of internal components, said battery including access external to said handset to provide electrical power to a base unit of said cordless telephone.

5. A cordless telephone comprising:
    a base unit; and
    a handset comprising:
        a plurality of internal components, and
        a battery to power at least some of said plurality of internal components, said battery including access external to said handset to provide electrical power to said base unit of said cordless telephone.

6. The cordless telephone according to claim 5, wherein:
    said base unit is adapted to receive power from said handset.

7. The cordless telephone according to claim 5, wherein said at least some of said internal components include:
    an audio circuit; and
    a transceiver circuit.

8. A handset of a cordless telephone, said handset comprising:
    a processor; and
    a battery to power said processor, said battery including access external to said handset to provide electrical power to a base unit of said cordless telephone.

9. The handset of a cordless telephone according to claim 8, further comprising:
    an external cord for directly interconnecting said handset with said base unit.

10. The handset of a cordless telephone according to claim 9, wherein:
    said external cord interconnects said battery of said handset with said base unit.

11. A method of supplying power by a handset of a cordless telephone, comprising:
    coupling a battery of said handset of said cordless telephone to a base unit of said cordless telephone; and
    powering said base unit from said battery of said handset.

12. A method of overcoming a power shortage to a cordless telephone, comprising a selection of one of the following steps to operate said cordless telephone during said power shortage:

powering a base unit of a cordless telephone from a remote handset of said cordless telephone; and connecting said remote handset of said cordless telephone directly to a telephone line from a PSTN, bypassing said base unit of said cordless telephone.

13. The method of overcoming a power shortage to a cordless telephone according to claim 12, wherein:

said bypassed base unit is unpowered while said remote handset remains powered.

\* \* \* \* \*